(12) United States Patent
Dung et al.

(10) Patent No.: US 11,808,191 B2
(45) Date of Patent: Nov. 7, 2023

(54) APPARATUS FOR EXHAUST GAS AFTERTREATMENT HAVING AN ANNULAR HEATED DISC

(71) Applicant: Vitesco Technologies GmbH, Regensburg (DE)

(72) Inventors: Sebastian Dung, Munich (DE); Peter Hirth, Munich (DE)

(73) Assignee: VITESCO TECHNOLOGIES GMBH, Regensburg (DE)

(*) Notice: Subject to any disclaimer, the term of this patent is extended or adjusted under 35 U.S.C. 154(b) by 0 days.

(21) Appl. No.: 17/783,564

(22) PCT Filed: Dec. 4, 2020

(86) PCT No.: PCT/EP2020/084624
§ 371 (c)(1),
(2) Date: Jun. 8, 2022

(87) PCT Pub. No.: WO2021/115950
PCT Pub. Date: Jun. 17, 2021

(65) Prior Publication Data
US 2023/0011983 A1    Jan. 12, 2023

(30) Foreign Application Priority Data
Dec. 9, 2019   (DE) ............... 10 2019 219 157.6

(51) Int. Cl.
*F01N 3/20*   (2006.01)
(52) U.S. Cl.
CPC ........ *F01N 3/2013* (2013.01); *F01N 2240/16* (2013.01); *F01N 2330/02* (2013.01); *F01N 2470/24* (2013.01)

(58) Field of Classification Search
CPC .............. F01N 3/2013; F01N 2240/16; F01N 2330/02; F01N 2470/24; Y02T 10/12
See application file for complete search history.

(56) References Cited

U.S. PATENT DOCUMENTS

| 4,723,973 A | 2/1988 | Oyobe et al. |
| 5,232,671 A * | 8/1993 | Brunson ............... F01N 3/2814 |
| | | 422/177 |

(Continued)

FOREIGN PATENT DOCUMENTS

| DE | 102015111689 | 10/2016 |
| DE | 102019123486 | 3/2020 |

(Continued)

OTHER PUBLICATIONS

Machine Translation of EP-3406873-B1 (Year: 2021).*

(Continued)

*Primary Examiner* — Brandon D Lee
(74) *Attorney, Agent, or Firm* — Cozen O'Connor

(57) ABSTRACT

A device for the aftertreatment of exhaust gases from an internal combustion engine has a tubular first flow section, a deflecting region and a annular second flow section, the second flow section being arranged between an inner wall delimiting the first flow section and an outer wall delimiting the second flow section. At least one annular honeycomb body is arranged in the second flow section, and at least one annular heating disk is arranged in the second flow section, the heating disk being electrically contactable by at least two electrical feedthroughs, which are arranged on the outer wall.

11 Claims, 4 Drawing Sheets

(56) References Cited

U.S. PATENT DOCUMENTS

| | | | |
|---|---|---|---|
| 5,525,309 | A | 6/1996 | Breuer et al. |
| 5,546,746 | A | 8/1996 | Whittenberger |
| 5,672,324 | A | 9/1997 | Okamoto |
| 6,513,324 | B2 * | 2/2003 | Bruck ................... F01N 3/2026 422/177 |
| 2002/0092298 | A1 | 7/2002 | Bruck et al. |
| 2015/0030509 | A1 * | 1/2015 | Brueck .............. B01D 53/8678 422/174 |
| 2020/0072107 | A1 * | 3/2020 | Aufranc ................ F01N 3/2013 |
| 2021/0123369 | A1 * | 4/2021 | Sommier .............. F01N 3/2825 |

FOREIGN PATENT DOCUMENTS

| | | | | |
|---|---|---|---|---|
| DE | 197 11 681 | | 9/2020 | |
| EP | 3406873 | A1 * | 11/2018 | ........... F01N 13/009 |
| ER | 3406873 | | 11/2018 | |
| FR | 1857895 | | 9/2018 | |
| FR | 3085429 | | 3/2020 | |
| GB | 746266 | | 3/1956 | |
| JP | H07189680 | A * | 7/1995 | |
| WO | WO-2018095838 | A1 * | 5/2018 | ........... F01N 3/2066 |

OTHER PUBLICATIONS

Machine Translation of WO-2018095838-A1 (Year: 2018).*
Machine Translation of JP-H07189680-A (Year: 1995).*
International Search Report issued in corresponding PCT Application PCT/EP2020/084624.
Written Opinion issued in corresponding PCT Application PCT/EP2020/084624.
Office Action issued in corresponding German Application No. 10 2019 219 157.6.
Office Action dated Jul. 20, 2023 issued in European Patent Application No. 20820383.6.
Office Action dated Aug. 4, 2023 issued in Chinese Patent Application No. 202080085655.7.

* cited by examiner

APPARATUS FOR EXHAUST GAS AFTERTREATMENT HAVING AN ANNULAR HEATED DISC

CROSS-REFERENCE TO RELATED APPLICATIONS

This is a U.S. national stage of International application No. PCT/EP2020/084624, filed on Dec. 4, 2020, which claims priority to German Application No. 10 2019 219 157.6 filed Dec. 9, 2019, the content of each of which is incorporated herein by reference.

BACKGROUND OF THE INVENTION

1. Field of the Invention

The invention relates to a device for the aftertreatment of exhaust gases from an emission source, in particular an internal combustion engine.

2. Description of the Prior Art

Catalytic converters are known for the aftertreatment of exhaust gases from emission sources, such as in particular internal combustion engines, contributing to chemically converting the pollutants carried along in the exhaust gas. For this purpose, catalytic converters have honeycomb bodies which can be flowed through and are provided with a catalytically active coating. A large number of different designs of such catalytic converters are known in the prior art.

One such technique is the so-called ring catalyst. This has a central tubular flow section, a deflecting region and an annular flow section. The two flow sections can have matrices which serve as a honeycomb body which can be flowed through. Such a honeycomb body preferably sits in the annular flow section, while the tubular flow section and the deflecting region serve as an additional mixing section for the flowing exhaust gas.

To further improve the aftertreatment of the exhaust gas, heating elements are known, around which the exhaust gas flows, as a result of which on the one hand the exhaust gas is heated and furthermore the structures surrounding the heating elements are also heated. Such a heating element, in particular in the form of a heating disk, is arranged upstream or downstream of the honeycomb body, for example in the direction of flow, or in the case of a divided honeycomb body also in the middle thereof.

A particular disadvantage of the devices in the prior art is that the structure of the heating disk itself and the design of the electrical feedthroughs are not optimal for use in a ring catalyst. In particular, the electrical contacting of the heating disk by means of two separate electrical feedthroughs for the two poles has so far not been adequately solved.

SUMMARY OF THE INVENTION

The present invention therefore addresses the problem of creating a device for exhaust gas aftertreatment so as to make it possible to combine the advantages of an additional electrical heater with the specific advantages of a ring catalyst and in particular to improve the electrical feedthrough and contacting.

The problem relating to the prior art device may be solved by a device for the aftertreatment of exhaust gases from an emission source, in particular an internal combustion engine, with a first tubular flow section, a deflecting region and a second annular flow section, the annular flow section being formed between an inner wall delimiting the tubular flow section and an outer wall delimiting the annular flow section, at least one annular honeycomb body being arranged in the annular flow section, and at least one annular heating disk being arranged in the annular flow section, it being possible for the heating disk to be electrically contacted by at least two electrical feedthroughs, which are arranged on the outer wall.

In the simplest case, the electrical conductor is a metal wire which can be heated using the ohmic resistance. Alternatively, the conductor itself may also be configured as a honeycomb body, which in particular has a very great length compared to its height and depth.

The conductor is connected to the positive pole and the negative pole of a voltage source by way of the two electrical feedthroughs. It is therefore not necessary to use the housing of the catalytic converter or other structures as return conductors. This is particularly advantageous and necessary with regard to higher on-board voltages, for example to avoid electric shocks to people or other critical voltage accidents.

The electrical feedthroughs are arranged on the outer wall and advantageously do not protrude deep into the heating disk. This ensures that no more cross-sectional area that can be flowed through than is absolutely necessary is covered by the heating disk.

Due to the special structural features of the ring catalyst with a tubular flow section through which exhaust gas can flow, the arrangement of an electrical feedthrough on the inner wall is not possible or can only be achieved with great effort. The electrical feedthroughs are arranged offset from one another in the circumferential direction of the outer wall.

It is particularly advantageous if the heating disk is formed by at least one electrical conductor, which is arranged in a disk-shaped region defining the heating disk within the annular flow section. The conductor is preferably arranged in a region delimited in the axial direction of the annular flow section, that is to say in the main direction of flow, in a plane within the annular flow section.

The conductor may for example be wound spirally. In particular, two conductor elements may also respectively protrude from one of the electrical feedthroughs into the annular flow section, the two conductors then being electrically conductively connected to one another at their free ends in the flow section. Alternatively, a conductor may also have a deflection point, at which it is bent in such a way that the winding direction is reversed.

It is also advantageous if each of the two ends of the conductor is in electrically conductive contact in each case with one of the electrical feedthroughs. In this way, a closed circuit can be routed from the positive pole to the negative pole of the voltage source arranged outside.

A preferred exemplary embodiment is characterized in that the electrical feedthroughs are arranged directly adjacent to one another on the outer wall. In particular, the electrical feedthroughs are arranged in a common plane in the axial direction and are only offset from one another in the circumferential direction.

Also, it is preferable if the conductor is wound spirally. A spiral winding is particularly advantageous in order to be able to allow heating that is as uniform as possible over the entire flow cross section. In addition, the spiral winding can be easily achieved.

In addition, it is advantageous if the conductor is arranged in the annular flow section in a wavy manner, the wave crests of the conductor being arranged adjacent but spaced apart from the outer wall and the wave troughs of the conductor being arranged adjacent but spaced apart from the inner wall.

The wavy course of the conductor between the outer wall and the inner wall allows a flower-like cross section in a view from above to be achieved, which also allows good heating to be achieved. The conductor leads here from the first electrical feedthrough back and forth always between the outer wall and inner wall and has reversal points on the walls in each case. The wave width and wave height can be set as required. The total installed length of the electrical conductor can be increased by a high wave height and small wave width.

Furthermore, it is advantageous if the heating disk is formed by two regions lying one behind the other in the direction of flow. The heating disk may also be formed from a number of regions arranged one behind the other in the axial direction. It is thus also possible to arrange two electrical conductors one behind the other in the axial direction.

It is also expedient if the two regions have in each case an electrical conductor, each conductor being connected at the ends to an electrical feedthrough, the electrical conductors of the two regions being electrically conductively connected to one another at least at one point, in particular at their free end region.

In an advantageous embodiment, the heating disk is formed from two individual heating disk elements, each of which has a conductor which is arranged within the annular flow section and is connected at one of its ends to an electrical feedthrough. The conductor of each heating disk element is wound spirally in its own plane. The respective free end regions of the conductors are conductively connected to one another by an electrically conductive bridge.

The two heating disk elements may have conductors wound in the same direction or in opposite directions. In one exemplary embodiment, the two heating disk elements are identical and are used in a mirror-inverted fashion in order to ensure that the two conductors are aligned with one another wound in opposite directions.

In addition, it is advantageous if the heating disk is formed from two heating disk halves. The heating disk halves are distinguished in particular by the fact that the heating disk is separated into the two halves within the plane of the heating disk. There is therefore no arrangement of the halves one after the other viewed in the axial direction.

Furthermore, it is expedient if the heating disk halves are connected to one another at electrically conductive bridge elements which are conductively connected to the electrical feedthroughs. This is advantageous in order to ensure that no unwanted short circuits are generated between the two electrical poles of the voltage source and furthermore that there are no unwanted heat maxima, for example as a result of unfavorable current paths. The bridge elements are in each case electrically conductively connected to one of the electrical feedthroughs. A number of sections of the electrical conductor are then stretched between the two bridge elements, so that a number of different current paths are in each case formed between the bridge elements.

It is also preferable if the electrical feedthroughs are offset from one another in the direction of flow.

Advantageous developments of the present invention are described in the dependent claims and in the description of the figures that follows.

BRIEF DESCRIPTION OF THE DRAWINGS

The invention will be explained in detail in the following text on the basis of exemplary embodiments with reference to the drawings, in which.

DETAILED DESCRIPTION OF THE PRESENTLY PREFERRED EMBODIMENTS

Figure 1:
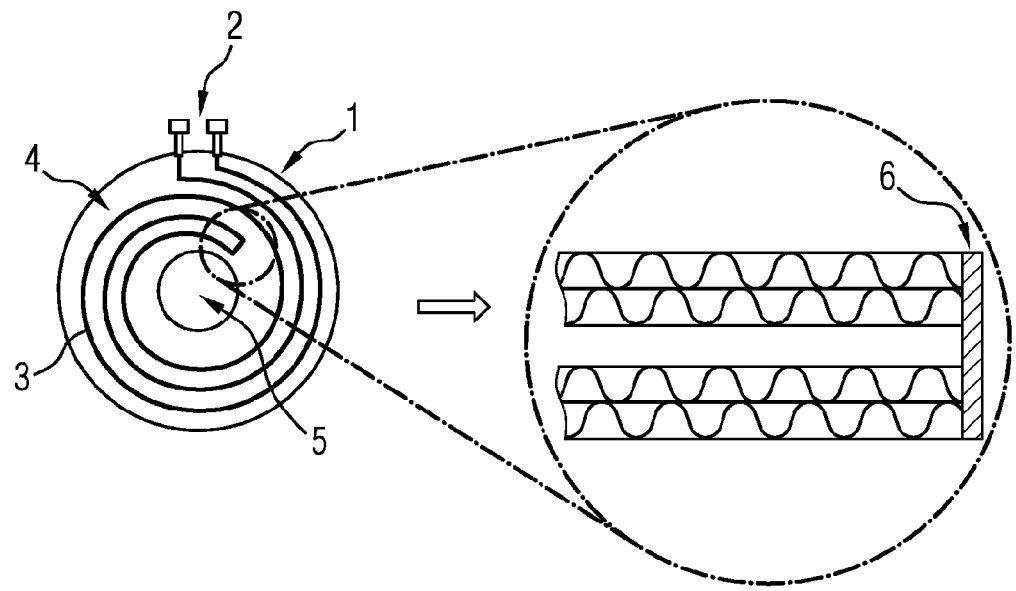
FIG. 1 shows a view of a heating disk, two parts of the conductor being connected with an electrically conductive bridge.

FIG. 1 shows, on the left side, a heating disk 1 with two electrical feedthroughs 2 arranged on the outer wall. The electrical conductor 3 is arranged inside the annular flow section 4, which is arranged between the inner wall of the tubular flow section 5 and the outer wall of the annular flow section 4.

The electrical conductor 3 is wound spirally within the annular flow section 4. The conductor 3 is connected in electrically contact to the two electrical feedthroughs 2. Electrical feedthroughs in general are known in the prior art. For use according to the invention, in particular a suitable feedthrough, which is suitable for vehicle electrical system voltages of preferably 48 volts and higher, is to be selected.

In the exemplary embodiment in FIG. 1, the electrical conductor 3 is formed from two sections which are connected to one another at their free end, that is to say the end which is not connected to the electrical feedthrough, by an electrically conductive connecting means 6. The connecting means 6 represents the reversal point of the conductor 3. From this point, the spiral winding runs in the opposite direction again from the radially inner region of the annular flow section 4 to the radially outer region.

A detailed view of this reversal point is shown in the right-hand region of FIG. 1. It can also be seen here that the conductor 3 may also be formed from wound metal foils. Here, the same process is used to produce the electrical conductor as is used, for example, to produce matrices for catalytic converters. In an advantageous embodiment, the electrical conductor may also have a catalytic effect.

Figure 2:
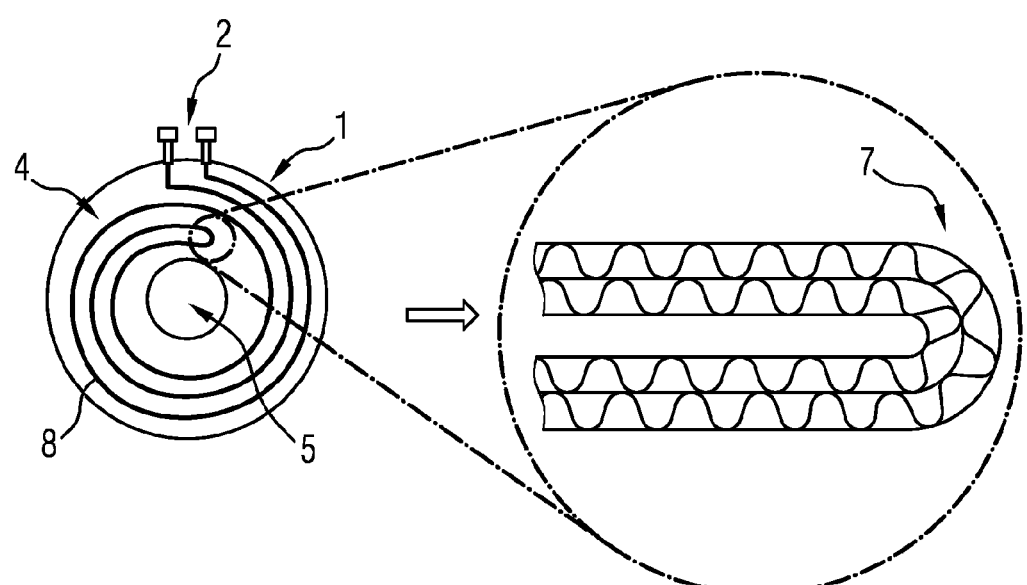
FIG. 2 shows a view of a heating disk, the conductor having a bend which defines a deflection point.

FIG. 2 shows a structure similar to FIG. 1, and therefore identical reference numbers are used for identical parts.

In FIG. 2, the electrical conductor 8 basically has a similar structure to the conductor 3 of FIG. 1. But instead of a two-part structure with a connector 6, here the conductor 8 is constructed in one piece and the reversal of direction is produced by a corresponding bend 7 or fold of the conductor 8.

Figure 3:
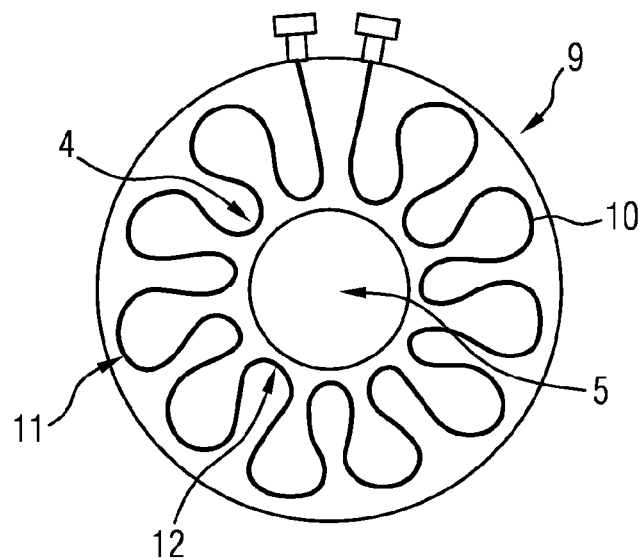
FIG. 3 shows a view of a heating disk, the conductor being arranged in a flower-like fashion in the annular flow section.

FIG. 3 shows a heating disk 9 with an electrical conductor 10. The conductor 10 is arranged in a wavy manner. The wave runs from the outer wall of the annular flow section 4 to the inner wall of the tubular flow section 5 in the circumferential direction along the annular flow section 5. The wave crests 10 are arranged adjacent to the outer wall, while the wave troughs 12 are arranged adjacent to the inner wall. In particular, both the wave crests 10 and the wave troughs 12 are not in direct contact with the outer wall or the inner wall. In this way, an air gap running around in the circumferential direction is generated between the electrical conductor 10 and the outer wall or the inner wall. The electrical conductor 10 crosses this gap in the region of the electrical feedthrough. The height of the wave, the opening width and the shape of the waveform can be adjusted as required.

Figure 4:
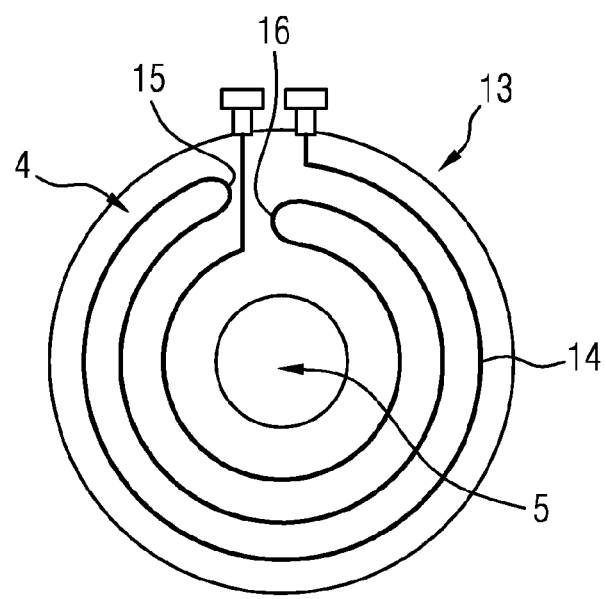
FIG. 4 shows a view of a heating disk with a spirally wound conductor.

FIG. 4 shows a view of a heating disk 13, the conductor 14 being arranged spirally within the annular flow section 4. The conductor 14 has at least two deflection points 15, 16, after which the course of the conductor 14 is in the opposite direction to the section in front of it. The conductor 14 is thus intertwined. The conductor 14 is arranged in such a way that the spiral-shaped and intertwined section runs from radially outside to radially inside, with another section of the conductor 14 running in a straight line from radially inside to radially outside and being contacted there at the end with one of the electrical feedthroughs.

Figure 5:
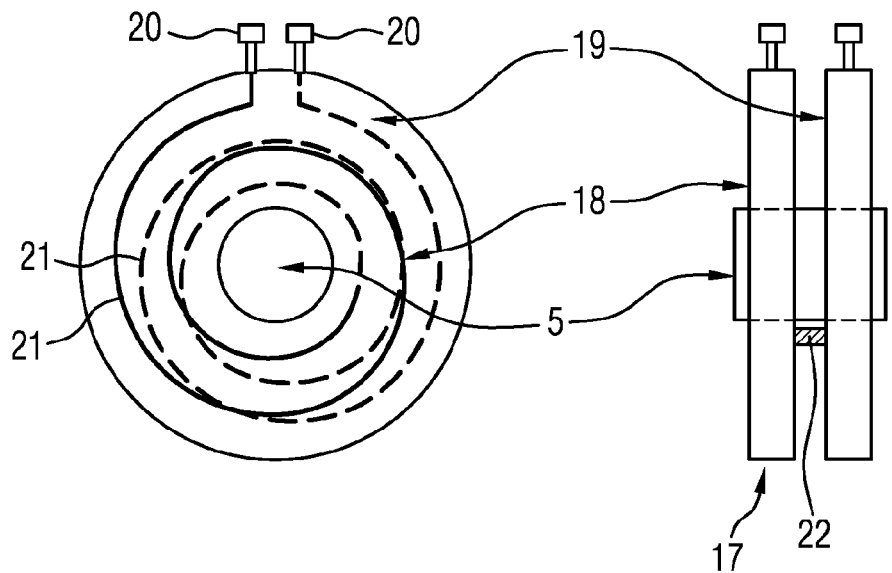
FIG. 5 shows two views of an embodiment with a heating disk which has two regions lying one behind the other in the direction of flow.

FIG. 5 shows another embodiment of a heating disk 17. The heating disk 17 is divided into two regions 18, 19 arranged one behind the other along the axial direction, that is to say the main direction of flow. Each of these regions 18, 19 has in each case an electrical feedthrough 20, as well as a spirally bent conductor 21. The two regions 18, 19 or the conductors 21 are electrically conductively connected to one another by an electrical connector 22 at their free end region.

The regions 18, 19 are arranged spaced apart from one another in the axial direction. This can be accomplished for example by electrically insulating supporting pins, which are for example inserted into the honeycomb structure of the conductors.

The electrically conductive connection by the connector 22 creates a common electrical conductor 21 across the two regions 18, 19, which together with the two electrical feedthroughs 20 forms a functional heating disk 17. Due to the arrangement of the conductor 21 in two planes, on the one hand in the region 18 and on the other hand in the region 19, a greater heat output can be generated.

The conductors 21 may be arranged in the same direction or in opposite directions in their respective regions. In the simplest case, two identical individual heating disks are created, with one arranged mirror-inverted to the other. In particular, this makes the production of the heating disks forming the regions 18, 19 simple and inexpensive.

Figure 6:
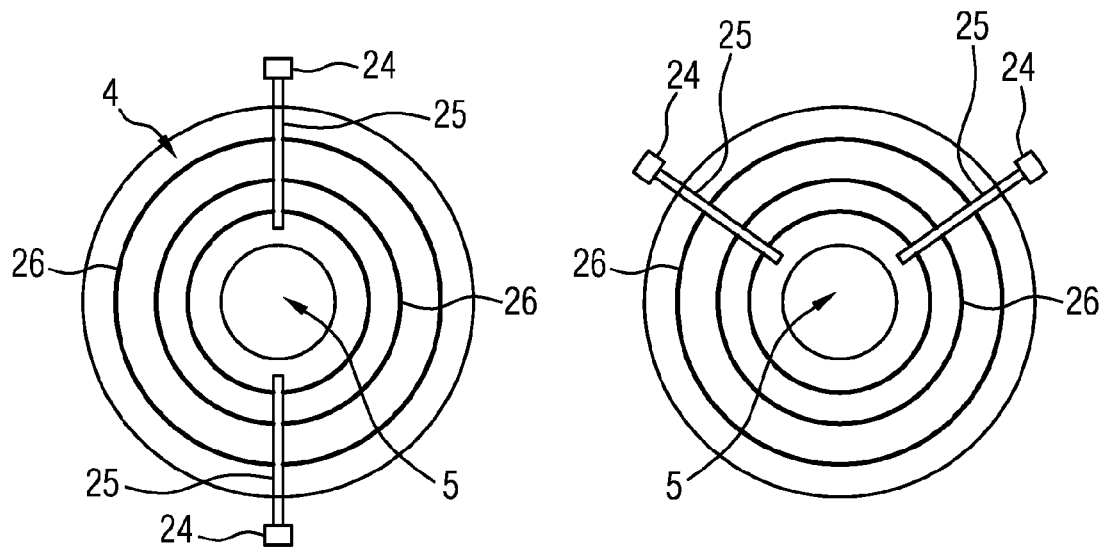
FIG. 6 shows two views of heating disks, the heating disks being formed in each case from two heating disk halves.

FIG. 6 shows two versions of a heating disk 23. The heating disks 23 have in each case two electrical feedthroughs 24. In the exemplary embodiment on the left, these are arranged offset from one another by 180 degrees in the circumferential direction. In the exemplary embodiment on the right, the feedthroughs 24 are arranged offset from one another by approximately 90 degrees in the circumferential direction.

An electrically conductive bridge element 25 is connected to the feedthroughs 24 on the inside. These bridge elements establish the electrically conductive connection with the actual heating conductor 26, which is arranged in the annular flow section.

The conductors 26 run between the bridge elements 25 and are arranged spaced apart from one another. This results in a current flow through one of the feedthroughs 24 along the bridge element 25 connected in each case to the conductors 26 to the other bridge element 25 and finally to the second feedthrough 24.

The conductors 26 can in each case be firmly connected to one of the bridge elements 25 in the annular flow section prior to assembly, while they are in each case firmly connected to the other bridge element 25 respectively after insertion, for example by soldering.

Figure 7:
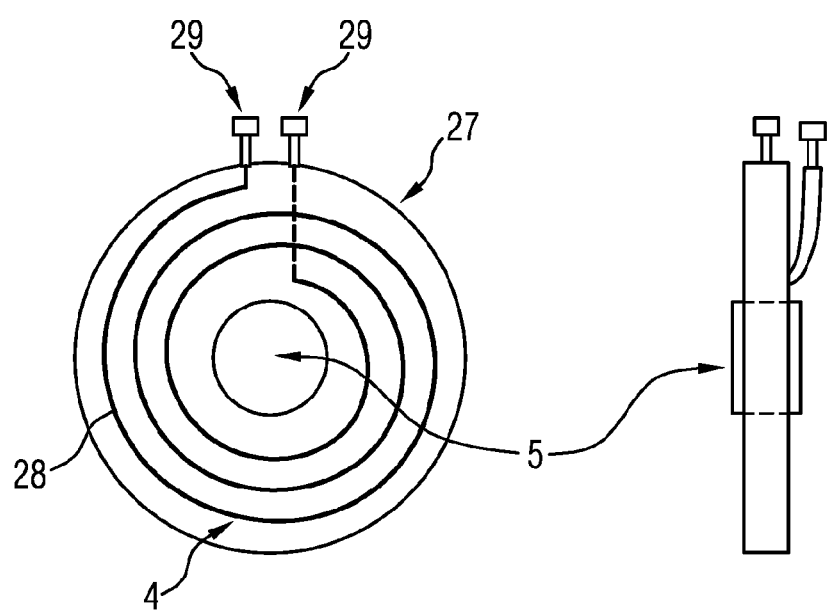
FIG. 7 shows two views of a heating disk, the electrical feedthroughs of the heating disk being arranged offset from one another in the axial direction.

FIG. 7 shows an alternative embodiment of a heating disk 27. The conductor 28 is also arranged in a spiral shape within the annular flow section 4. In contrast to the previously shown exemplary embodiments, here the electrical feedthroughs 29 do not lie in a common plane, but are arranged offset from one another along the axial direction.

The conductor 28 runs from one of the feedthroughs 29 spirally in a plane with this feedthrough 29 from radially outside to radially inside. There the conductor 28 is deflected in the axial direction and finally led to the other feedthrough 29, which is arranged axially offset from the first feedthrough 29.

A side view of the heating disk is shown in the region on the right, in which it can be seen how the conductor 28 is deflected out of the main plane, in which it is arranged in a spiral shape, and is led to the feedthrough 29.

The different features of the individual exemplary embodiments can also be combined with one another. In particular, the structure, the arrangement and the contacting of the conductor, the feedthroughs, the connector and the bridges can be combined with one another within the scope of technical possibilities.

The exemplary embodiments of FIGS. 1 to 7 have in particular no limiting character and serve to illustrate the concept of the invention.

Although exemplary embodiments are explained in the above description, it should be noted that numerous modifications are possible. It should moreover be pointed out that the exemplary embodiments are merely examples which are not intended to limit the scope of protection, the applications and the structure in any way. Instead, the above description gives a person skilled in the art a guideline for the implementation of at least one exemplary embodiment, wherein various changes may be made, especially with regard to the function and arrangement of the integral parts described, without departing from the scope of protection as it is apparent from the claims and combinations of features equivalent thereto.

The invention claimed is:

1. A device for aftertreatment of exhaust gases from an emission source comprising an internal combustion engine, the device comprising:
   a tubular first flow section:
   a deflecting region:
   an annular second flow section arranged between an inner wall delimiting the tubular first flow section and an outer wall delimiting the annular second flow section:
   at least one annular honeycomb body arranged in the annular second flow section and encircling the tubular first flow section, said at least one annular honeycomb body forming a conductor; and
   at least one annular heating disk arranged in the annular second flow section;
   wherein the at least one annular heating disk is electrically contactable by at least two electrical feedthroughs arranged on the outer wall.

2. The device as claimed in claim 1, wherein the at least one annular heating disk is formed by at least one electrical conductor arranged in a disk-shaped region defining the at least one annular heating disk within the annular second flow section.

3. The device as claimed in claim 1, wherein each end of the conductor is in electrically conductive contact with one respective electrical feedthrough of the at least two electrical feedthroughs.

4. The device as claimed in claim 1, wherein the at least two electrical feedthroughs are arranged directly adjacent to one another on the outer wall.

5. The device as claimed in claim 3, wherein the conductor is wound spirally.

6. The device as claimed in claim 3, wherein the conductor is arranged in the annular second flow section in a wavy manner, wave crests of the conductor being arranged adjacent but spaced apart from the outer wall and wave troughs of the conductor being arranged adjacent but and spaced apart from the inner wall.

7. The device as claimed in claim 1, wherein the at least one annular heating disk is formed by two regions lying behind one another in a direction of flow.

8. The device as claimed in claim 7, wherein the two regions each have an electrical conductor, each electrical conductor being connected at ends to an electrical feedthrough, the electrical conductors of the two regions being electrically conductively connected to one another at least at one point comprising a free end region.

9. The device as claimed in claim 1, wherein the at least one annular heating disk is formed from two heating disk halves.

10. The device as claimed in claim 9, wherein the at least one annular heating disk halves are connected to one another at electrically conductive bridge elements which are conductively connected to the electrical feedthroughs.

11. The device as claimed in claim 1, wherein the electrical feedthroughs are arranged offset from one another in a direction of flow.

* * * * *